May 2, 1933.  H. C. FRENTZEL, JR  1,906,565
OIL STRAINER OR THE LIKE
Filed Nov. 19, 1931
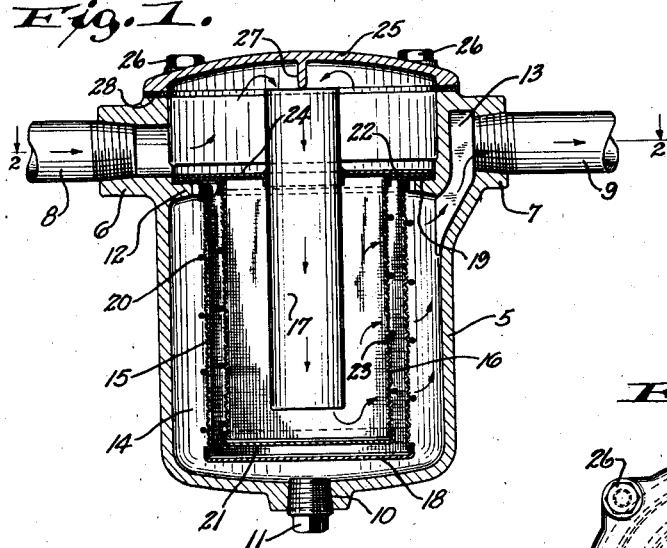
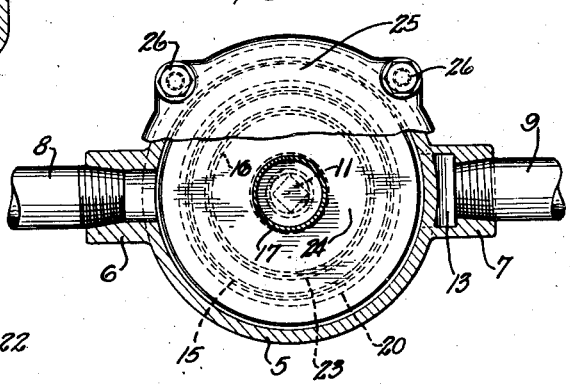
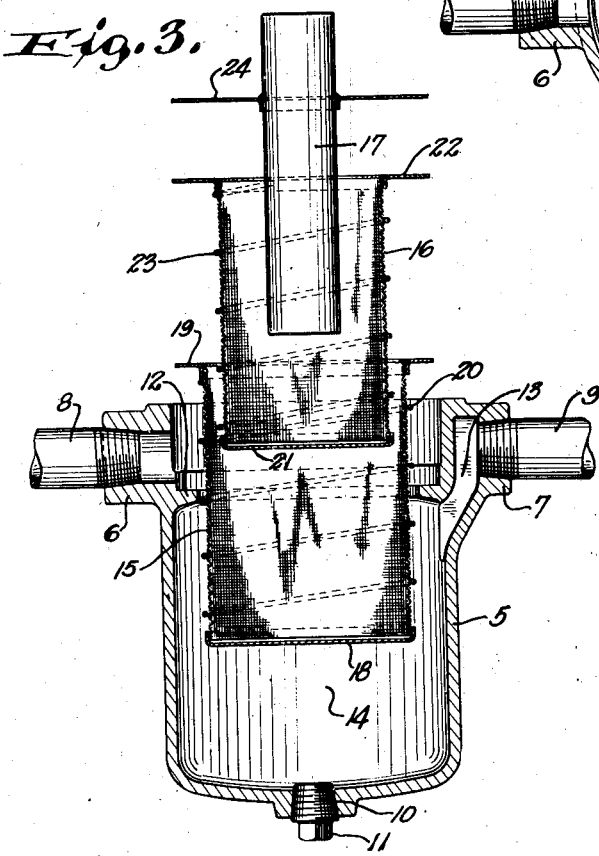
INVENTOR.
Herman C. Frentzel Jr.,
BY Morsell & Morsell
ATTORNEYS.

Patented May 2, 1933

1,906,565

UNITED STATES PATENT OFFICE

HERMAN C. FRENTZEL, JR., OF MILWAUKEE, WISCONSIN, ASSIGNORS, BY MESNE ASSIGNMENTS, TO MILWAUKEE AIR POWER PUMP CO., OF MILWAUKEE, WISCONSIN, A CORPORATION OF WISCONSIN

OIL STRAINER OR THE LIKE

Application filed November 19, 1931. Serial No. 576,068.

This invention relates to improvements in strainers adapted for general use in the purification of liquids, and particularly, although not solely, adapted for use in oil burner systems.

A general object of the invention is to provide an improved strainer for liquids of various kinds, which is simple and compact in construction, and which is also highly efficient.

In oil burner systems, fuel in the form of a suitable grade of oil is conducted as required from a storage or supply tank to the burner proper within the furnace or boiler combustion chamber, by means of an elongated tubular connection or piping. It is customary to interpose in said pipe line some form of strainer through which the oil must flow before reaching the burner to insure removal from the oil of all foreign matter, grit, solids or other undesirable material.

The present invention contemplates particularly the provision of a novel, efficient and accessible strainer for interposition in the feed line of an oil burner or similar systems.

A further object of the invention is to provide a liquid strainer wherein two screening elements are mounted within the casing in spaced relationship so that fluid, in passing through the device, must be screened or strained by both of the elements.

A further object of the invention is to provide a liquid strainer including a pair of spacedly mounted screens and a central fluid introducing tube, all arranged for ready removal for cleaning or replacements.

A further object of the invention is to provide a liquid strainer so arranged that the screens may be removed and cleaned without interrupting the flow of liquid through the device.

A further object of the invention is to provide an oil strainer wherein certain screens and an oil tube are spacedly positioned centrally within the strainer casing and the casing cover is formed with means for holding said parts fixedly in their proper positions.

A further object of the invention is to provide an oil strainer utilizing cupped screen members, which, because of the novel reenforcing means employed in connection with the same, may be formed of fine mesh without danger of being unduly distorted by pressures.

A further object of the invention is to provide in a fuel line, an oil screening device of cupped formation with opposed inlet and outlet openings and further arranged so that oil entering the device is directed into the lower portion of the cupped member whereby the cupped member will fill prior to passage of oil through the outlet opening, insuring a steady flow of oil through the outlet and causing an upward screening action of the oil whereby sediment will drop to the bottom portions of the screen members and insuring relatively large clean screening surfaces at all times.

A further object of the invention is to provide an oil strainer which is of very simple construction, which is strong and durable, in which the component parts are readily accessible, and which is well adapted for the purposes described.

With the above and other objects in view, the invention consists of the improved oil strainer, and its parts and combinations as set forth in the claims, and all equivalents thereof.

In the accompanying drawings in which the same reference characters indicate the same parts in all of the views:

Fig. 1 is a vertical sectional view of the improved oil strainer with the parts thereof in normal positions;

Fig. 2 is a cross-sectional view taken on line 2—2 of Fig. 1 with a fragmentary showing of the cover; and Fig. 3 is a vertical sectional view illustrating the removal of the parts from the casing for cleaning or replacement.

Referring now more particularly to the drawings it will appear that the numeral 5 designates a cup-shaped casing formed near its upper open end portion with opposed bored bosses 6 and 7 into which the end portions of an oil inlet pipe 8 and an oil outlet pipe 9 extend. The bottom of said casing is provided with a central tapped drain opening 10 normally closed by a threaded plug 11 screwed thereinto. The interior of the casing, immediately below the internal openings of the bosses 6 and 7, is formed with an annular shoulder or flange 12. Also, internal communication with the bore of the boss 7 is only afforded by means of a duct 13 which opens into the main chamber 14 of the casing below the flange 12.

The internal elements of the strainer comprise an outer cylindrical screen 15, an inner cylindrical screen 16 of a lesser circumference, and a central oil tube 17. The outer screen 15 is composed of a cylinder of fine mesh screen closed at its lower end by a flanged bottom plate 18 with the flanged portion soldered or otherwise secured to the lower peripheral portion of the cylinder. The upper end portion of the screen cylinder is secured to and surrounded by a flanged horizontally, outwardly extending collar 19. The body of the cylindrical screen is surrounded by a spirally wound reenforcing wire 20 which at certain points is soldered or secured to the screen. By this means of reenforcement said screen is stiffened, but a fine grade of mesh may be utilized.

Similarly the inner screen 16 is composed of a screen cylinder, a bottom closure plate 21, an upper flanged collar 22, and a spiral reenforcing wire 23. The tube 17 is elongated and of a diameter considerably less than that of the inner screen cylinder and is surrounded by and has secured to its outer surface, somewhat below the upper end of the tube, a partition plate or diaphragm 24.

Normally the parts are assembled and positioned as shown in Fig. 1 with the flanged collar 19 of the outer screen 15 resting directly on the casing internal annular flange 12. The inner screen 16 is depended centrally within the outer screen, and the flanged collar 22 of said inner screen rests on the collar 19 and is supported by the casing flange 12. The partition plate 24 carried by the tube 17 forms a supporting means for said tube and rests on the collar 22 and is consequently supported by the casing flange 12. The tube 17 is so proportioned that when disposed as described it extends vertically centrally into the screen 16 with the lower open end of the tube a short distance above the bottom of the inner screen member. The open upper end portion of the tube lies in the plane of the upper end of the casing 5. The top of the casing is closed by a somewhat dome-shaped cover 25 which is removably secured onto the upper end of the casing in closing position by a plurality of bolts 26. The inner surface of said cover is formed with a depending diametrical rib 27. This rib is of considerable importance in that when the parts are in the normal assembled position shown in Fig. 1, said rib extends across the upper end of the tube 17 and bears thereon whereby the various members 19, 22 and 24 are held tightly against the casing flange 12 and the internal members of the strainer are held in proper positions and will not become dislodged therefrom. As shown, a gasket 28 is interposed between the adjacent surface portions of the casing and cover.

In operation oil flows through the inlet pipe 8 in the direction of the arrow and enters that portion of the casing which is above the partition plate 24. As said partition plate, except for the tube 17, closes the upper portion of the casing from the main chamber 14, the upper end portion of the tube will act as a dam and oil will rise in the upper casing portion until it reaches the level of the upper open end of said tube. The tube then permits a flow of oil downwardly into the lower portion of the inner screen 16 and the oil will flow outwardly through the mesh cylinder of said screen into the outer cylinder 15 and through its mesh screen. Obviously, the chamber 14 will ultimately become filled with oil and after the oil is discharged from the tube 17 it will rise and be screened of foreign matter by both screens in its upward travel. When the oil has reached the proper level in the casing 14 it will flow through the duct 13 and into the discharge pipe 9. This upward flow of the oil and the consequent upward and outward screening action produces very efficient results as the flow of the oil will tend to keep the screen surfaces clean and sediment and residue will gravitate to the bottom portions of the screens.

Whenever desired the strainer chamber 14 may be drained by removing the drain plug 11 and whenever it is desired to open the casing to clean, replace or inspect the internal parts, this is very easily accomplished. By unloosening the four bolts 26 the cover 25 may be removed, and then the screens 15 and 16 and the tube 17 may be easily withdrawn in the manner illustrated by Fig. 3.

While the improved strainer has been specifically described herein as having special utility when used in conjunction with oil burner systems, it is not intended to thereby limit the scope of the invention, and it will be apparent that the strainer is susceptible of effective use in the purification of liquids other than oil, as well as of other fluids.

From the foregoing description it will be seen that the improved oil strainer is of simple and novel construction, and is well adapted for the purposes set forth.

What is claimed as the invention is:

1. A straining device, comprising a cupped casing having separated inlet and outlet openings in the upper portion thereof, a partition within the casing dividing the same into a small upper chamber and a main lower chamber, internal strainer elements spacedly and removably mounted within said casing including a cylindrical screen and a central tube extending through the partition and into the lower portion of said screen and projecting substantial distances beyond both faces of the partition, and a removable cover for the upper end portion of said casing.

2. A straining device, comprising a cupped casing having separated inlet and outlet openings in the upper portion thereof, a partition within the casing dividing the same into a small upper chamber and a main lower chamber, internal strainer elements spacedly and removably mounted within said casing including a pair of nested cylindrical screens and a central tube extending through the partition and into the lower portion of the inner screen and projecting substantial distances beyond both faces of the partition, said partition being connected to one of said elements and being removable from the casing therewith, and a removable cover for the upper end portion of the casing.

3. A straining device, comprising a casing having separated inlet and outlet openings in the upper portion thereof, a partition dividing the interior of said casing into a small upper chamber and a main lower chamber, the inlet opening entering the upper chamber and the outlet opening entering the main chamber on opposite sides of said partition, a cupped screen member within the main chamber, and a tube extending from the upper chamber above said partition through said partition and into the lower portion of said screen member.

4. A straining device, comprising a cupped casing having separated inlet and outlet openings in the upper portion thereof, a partition removably mounted within said casing and dividing the interior of the same into a small upper chamber and a main lower chamber, the inlet opening entering the upper chamber and the outlet opening entering the main chamber on opposite sides of said partition, cupped screening devices removably and spacedly mounted within said main chamber below the partition, a removable tube extending into a lower portion of a screening device, and a removable cover for the open end of said casing and arranged with a transverse rib to engage said tube to hold said removable internal members in position with the casing.

5. A straining device, comprising a cupped casing having separated inlet and outlet openings in the upper portion thereof, the interior of said casing being formed with an annular shoulder below the inlet opening and above the outlet opening, a pair of nested cupped screen members removably and spacedly depended from said annular shoulder into the lower portion of the casing, a tube extending from the upper interior portion of the casing into a lower portion of the inner screen member, a partition secured to said tube and supported by said annular shoulder, and a removable cover for the open end of said casing and arranged to engage said tube to hold all of said removable internal members in position within the casing.

In testimony whereof, I affix my signature.

HERMAN C. FRENTZEL, JR.